(12) United States Patent
Dunst et al.

(10) Patent No.: US 12,485,709 B2
(45) Date of Patent: Dec. 2, 2025

(54) CENTRAL TIRE INFLATION SYSTEM

(71) Applicant: Airdown, Inc., Beverly Hills, FL (US)

(72) Inventors: Bradley Dunst, Christmas, FL (US); Mark Oostdyk, Cocoa, FL (US)

(73) Assignee: Airdown, Inc., Beverly Hills, FL (US)

( * ) Notice: Subject to any disclaimer, the term of this patent is extended or adjusted under 35 U.S.C. 154(b) by 525 days.

(21) Appl. No.: 18/057,862

(22) Filed: Nov. 22, 2022

(65) Prior Publication Data

US 2023/0092710 A1   Mar. 23, 2023

Related U.S. Application Data

(63) Continuation-in-part of application No. 16/700,082, filed on Dec. 2, 2019, now Pat. No. 11,529,831, which is a continuation of application No. 15/660,065, filed on Jul. 26, 2017, now Pat. No. 10,493,808.

(51) Int. Cl.
  *B60C 23/00* (2006.01)
  *B60C 29/06* (2006.01)
  *B60S 5/04* (2006.01)

(52) U.S. Cl.
  CPC .. *B60C 23/00354* (2020.05); *B60C 23/00363* (2020.05); *B60C 29/066* (2013.01); *B60C 29/068* (2013.01); *B60C 2200/06* (2013.01); *B60S 5/046* (2013.01)

(58) Field of Classification Search
  CPC ........ B60C 23/00354; B60C 23/00363; B60C 23/00318; B60C 23/00345
  See application file for complete search history.

(56) References Cited

U.S. PATENT DOCUMENTS

| | | | | |
|---|---|---|---|---|
| 5,398,743 A | * | 3/1995 | Bartos | B60C 23/003 152/416 |
| 6,145,559 A | * | 11/2000 | Ingram, II | B60C 23/00354 152/417 |
| 6,425,427 B1 | * | 7/2002 | Stech | B60C 23/00363 152/417 |

(Continued)

OTHER PUBLICATIONS

U.S. Appl. No. 16/700,082, filed Dec. 2, 2019.
U.S. Appl. No. 15/660,065, filed Jul. 26, 2017, now U.S. Pat. No. 10,493,808 issued Dec. 3, 2019.

*Primary Examiner* — Kip T Kotter
(74) *Attorney, Agent, or Firm* — Kelly G. Swartz; Widerman Malek, PL

(57) ABSTRACT

A central tire inflation system configured to maintain an air pressure on a first and second tire mounted to a wheel of a vehicle including a wheel assembly configured to be operably coupled to the wheel and including (1) a housing in fluid communication with an external air supply, (2) two check valves carried by the housing and in fluid communication with the air supply, (3) two tire air connectors carried by the housing and in fluid communication with the two check valves, respectively, and configured to be operably coupled to the two tires, respectively. The first tire, second tire, and air supply in fluid communication when both the first check valve and the second check valve are in an open position but not in fluid communication when either the first check valve or the second check valve is in a closed position.

14 Claims, 10 Drawing Sheets

(56) References Cited

U.S. PATENT DOCUMENTS

| | | | | |
|---|---|---|---|---|
| 7,530,379 B1* | 5/2009 | Becker | ............ | B60C 23/00318 |
| | | | | 152/416 |
| 2004/0173296 A1* | 9/2004 | White | ............ | B60C 23/00372 |
| | | | | 152/417 |
| 2004/0238093 A1* | 12/2004 | Nelson | ............ | B60C 23/00336 |
| | | | | 152/415 |
| 2005/0194080 A1* | 9/2005 | White | ............ | B60C 23/00318 |
| | | | | 152/417 |
| 2013/0087262 A1* | 4/2013 | Hennig | ............ | B60C 23/00 |
| | | | | 152/417 |
| 2013/0282232 A1* | 10/2013 | Medley | ............ | B60C 23/002 |
| | | | | 152/427 |
| 2015/0174972 A1* | 6/2015 | Zhou | ............ | B60C 23/00345 |
| | | | | 340/447 |
| 2016/0288590 A1* | 10/2016 | Hennig | ............ | B60C 23/00318 |
| 2018/0104994 A1* | 4/2018 | Lin | ............ | B60C 23/137 |
| 2018/0186198 A1* | 7/2018 | Zhou | ............ | B60C 23/00345 |

* cited by examiner

CENTRAL TIRE INFLATION SYSTEM

RELATED APPLICATIONS

This application is a continuation-in-part application of and claims priority under 35 U.S.C. § 120 of U.S. patent application Ser. No. 16/700,082 filed on Dec. 2, 2019 and titled CENTRAL TIRE INFLATION SYSTEM, which in turn is a continuation application of and claims priority under 35 U.S.C. § 120 of U.S. patent application Ser. No. 15/660,065, now U.S. Pat. No. 10,493,808, issued Dec. 3, 2019 filed on Jul. 26, 2017 and titled CENTRAL TIRE INFLATION SYSTEM. The contents of these applications are incorporated herein by reference.

FIELD OF THE INVENTION

The present invention relates generally to tire inflation and deflation systems, more specifically but not by way of limitation a central tire inflation system for vehicles that includes air shutoff valves inside each wheel of the vehicle and further provides adjustability to accommodate alternate size vehicles.

BACKGROUND OF THE INVENTION

Central tire inflation systems are commonly utilized on large commercial trucks to increase the performance of the truck across alternate terrain types. By way of example but not limitation, inflation systems are common on military vehicles that must traverse alternate terrains during a mission wherein the vehicle may be traversing across loose sand to asphalt in a single trip. It is desirable during traversing across different terrains such as the aforementioned to inflate and/or deflate the tires so as to optimize traction and other performance parameters for the instant terrain.

One issue with existing tire inflation systems is the use of external shut off valves. Utilization of external shutoff valves prevents the ability for the central tire inflation system to maintain a minimum tire pressure in the event of a tire emergency. If a tire suffers a catastrophic failure on a conventional central tire inflation system the tire can completely lose all of its air pressure, which can cause the tire to dislodge from the wheel and cause more damage to the vehicle. A further issue with existing central tire inflation systems is their inability to adjust to various vehicle wheel sizes and bolt patterns. Existing systems are limited to the wheel sizes and are unable to adjust to accommodate alternate wheel sizes restricting the ability for the central tire inflation system to be moved between vehicles. Lastly, current technology does not permit adjustment of the release valve to prevent tires from going flat and further ensure a minimum tire pressure is maintained.

Accordingly, there is a need for a central tire inflation system that is configured to provide adjustability to accommodate alternate wheel sizes and further provide an adjustable valve means to inhibit a tire from completing losing air pressure.

SUMMARY OF THE INVENTION

With the above in mind, embodiments of the present invention are related to a central tire inflation system configured to monitor and maintain an air pressure on a first tire and a second tire mounted to a wheel of a vehicle. The central tire inflation system may include a wheel assembly and a controller.

The wheel assembly may be configured to be operably coupled to the wheel and may include a housing, first and second check valves, and first and second tire air connectors.

The housing may be in fluid communication with an external air supply.

The first check valve may be carried by the housing and in fluid communication with the external air supply.

The second check valve may be carried by the housing and in fluid communication with the external air supply.

The first tire air connector may be carried by the housing and in fluid communication with the first check valve and may be configured to be operably coupled to the first tire.

The second tire air connector may be carried by the housing and in fluid communication with the second check valve and may be configured to be operably coupled to the second tire.

The first tire, second tire, and external air supply may be in fluid communication when both the first check valve and the second check valve are in an open position. The first tire and second tire may not be in fluid communication when either the first check valve or the second check valve is in a closed position.

The wheel assembly may also include a cap and a shaft.

The cap may be configured to be secured to the vehicle and to remain in a fixed position relative thereto. The housing may be rotatably secured to the cap.

The shaft may have a first end carried within the cap and adapted to be fluidly coupled to the external air supply. A second end of the shaft, which opposes the first end, may be in fluid communication with the first check valve and the second check valve. The second end of the shaft may have a flat, annular surface.

The housing may have a central channel, a first passageway, and a second passageway.

The central channel may be in fluid communication with the external air supply and extend from a top side to a bottom side of the housing.

The first passageway may be located on a bottom side of the housing and be configured to place the central channel in fluid communication with the first check valve.

The second passageway may be located on a bottom side of the housing and may be configured to place the central channel in fluid communication with the second check valve.

The housing may also have a central portion, a first arm member, and a second arm member. The first arm member may extend outward from the central portion. The second arm member may extend outward from the central portion opposite from the first arm member. The first arm member may include a first aperture being a first joined circle configuration and the second arm member may include a second aperture being a second joined circle configuration.

The wheel assembly may further include a plate, a bearing housing, a first roller bearing, a second roller bearing, and a seal.

The plate may be secured to the bottom side of the housing over an entirety of the first passageway and the second passageway.

The bearing housing may be adapted to receive the shaft and to secure to the housing.

The first roller bearing may be carried by the bearing housing and have a central annular opening.

The seal may have a central annular aperture and a first flat surface opposing a second flat surface. The first flat surface of the seal may be positioned proximate the flat annular surface of the shaft. The second flat surface of the seal may be positioned proximate the first roller bearing.

The second roller bearing may be positioned between the first roller bearing and the housing.

The first check valve may be configured to move to the closed position when a first tire air pressure drops below a first minimum air pressure value. The second check valve may be configured to move to the closed position when a second tire air pressure drops below a second minimum air pressure value.

The controller may include a housing and a central processing unit. The housing of the controller may have a plurality of walls and a bottom forming an interior volume. The controller may have a central processing unit having an electronic processing unit operable to receive, store, transmit and manipulate data. The controller may have a plurality of modes of operation, each of which may include default parameters for air pressure within the tires of the vehicle. The controller may also include a valve to regulate an air pressure of the external air supply. The central tire inflation system may be configured to monitor a first tire air pressure and a second tire air pressure and provide inflation or deflation thereof based the mode of operation.

In one embodiment, the central tire inflation system may be configured to monitor and maintain an air pressure on a first tire and a second tire mounted to a wheel of a vehicle. The central tire inflation system may include a wheel assembly, which may include a housing, plate, first and second check valves, first and second tire air connectors, cap and shaft. The wheel assembly may be configured to be operably coupled to the wheel. The housing may have (1) a central channel in fluid communication with an external air supply and extending from a top side to a bottom side of the housing, (2) a first passageway located on a bottom side of the housing and configured to place the central channel in fluid communication with a first check valve, and (3) a second passageway located on a bottom side of the housing and configured to place the central channel in fluid communication with a second check valve. The plate may be secured to the bottom side of the housing over an entirety of the first passageway and the second passageway. The first check valve may be carried by the housing and in fluid communication with the external air supply. The second check valve may be carried by the housing and in fluid communication with the external air supply. The first tire air connector may be carried by the housing and in fluid communication with the first check valve and configured to be operably coupled to the first tire. The second tire air connector may be carried by the housing and in fluid communication with the second check valve and configured to be operably coupled to the second tire. The cap may be configured to secure to the external air supply, secure to the vehicle, and to remain in a fixed position relative thereto. The shaft may have a first end carried within the cap and adapted to be fluidly coupled to the external air supply. A second end of the shaft, which opposes the first end, may be in fluid communication with the first check valve and the second check valve. The housing may be rotatably secured to the cap. The first tire, second tire, and external air supply may be in fluid communication when both the first check valve and the second check valve are in an open position. The first tire and second tire may not be in fluid communication when either the first check valve or the second check valve is in a closed position.

In one embodiment, the central tire inflation system may be configured to monitor and maintain an air pressure on a first tire and a second tire mounted to a wheel of a vehicle. The central tire inflation system may include a wheel assembly, which may include a housing, first and second check valves, first and second tire air connectors, cap, shaft, bearing housing, first roller bearing, and seal. The wheel assembly may be configured to be operably coupled to the wheel. The housing may be in fluid communication with an external air supply. The first check valve may be carried by the housing and in fluid communication with the external air supply. The second check valve may be carried by the housing and in fluid communication with the external air supply. The first tire air connector may be carried by the housing and in fluid communication with the first check valve and configured to be operably coupled to the first tire. The second tire air connector may be carried by the housing and in fluid communication with the second check valve and configured to be operably coupled to the second tire. The cap may be configured to secure to the vehicle, secure to the external air supply, and to remain in a fixed position relative thereto. The shaft may have a first end carried within the cap and a second, opposing end having a flat annular surface. The bearing housing may be adapted to receive the shaft and secure to the housing. The first roller bearing may be carried by the bearing housing and have a central annular opening. The seal may have a central annular aperture and a first flat surface opposing a second flat surface. The first flat surface of the seal may be positioned proximate the flat annular surface of the shaft. The second flat surface of the seal may be positioned proximate the first roller bearing. The housing may be rotatably secured to the cap. The first tire, second tire, and external air supply may be in fluid communication when both the first check valve and the second check valve are in an open position. The first tire and second tire may not be in fluid communication when either the first check valve or the second check valve is in a closed position.

BRIEF DESCRIPTION OF THE DRAWINGS

A more complete understanding of the present invention may be had by reference to the following detailed description and appended claims when taken in conjunction with the accompanying drawings wherein:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
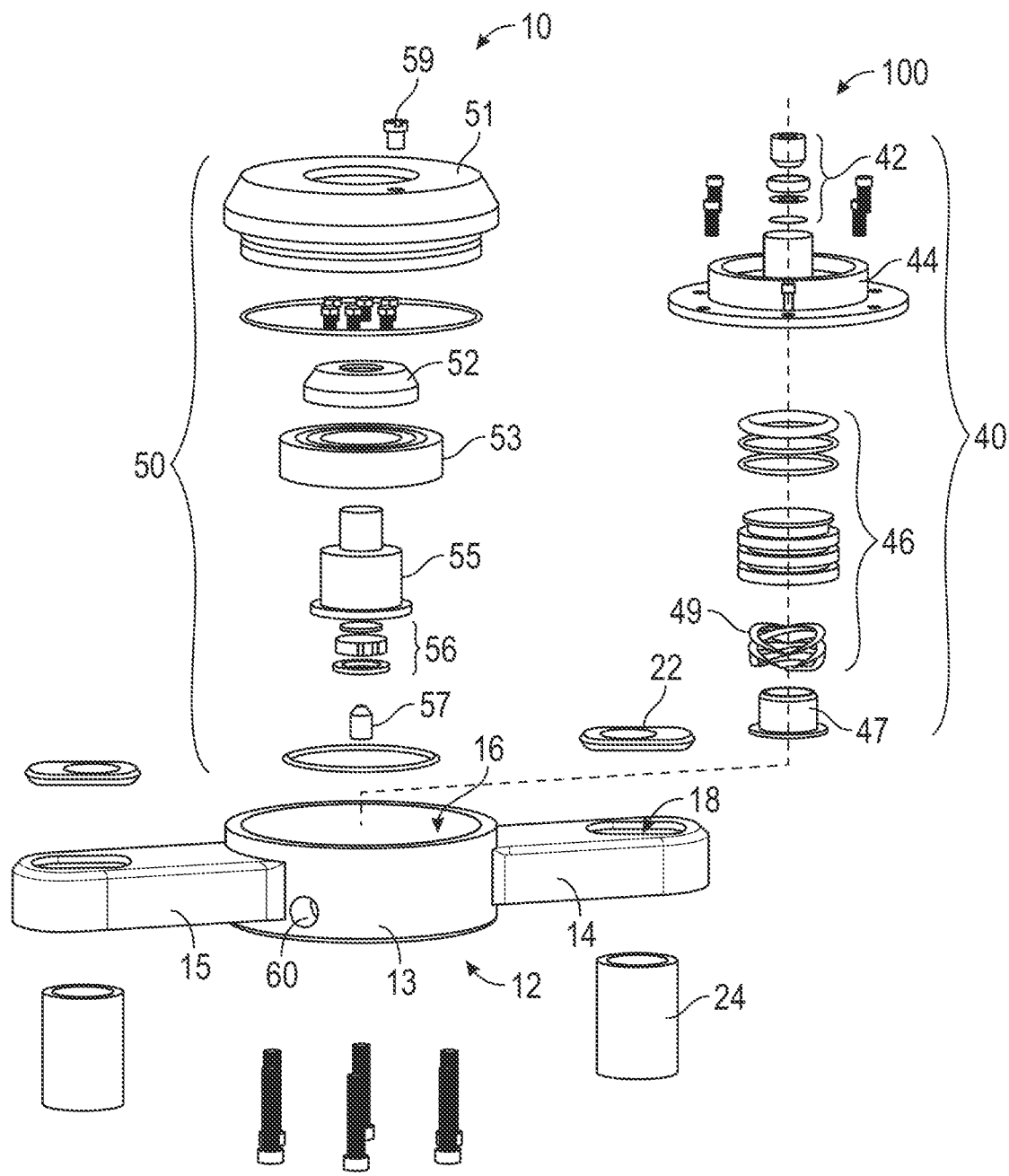
FIG. 1 is an exploded view of the wheel assembly according to an embodiment of the present invention.
Figure 2:
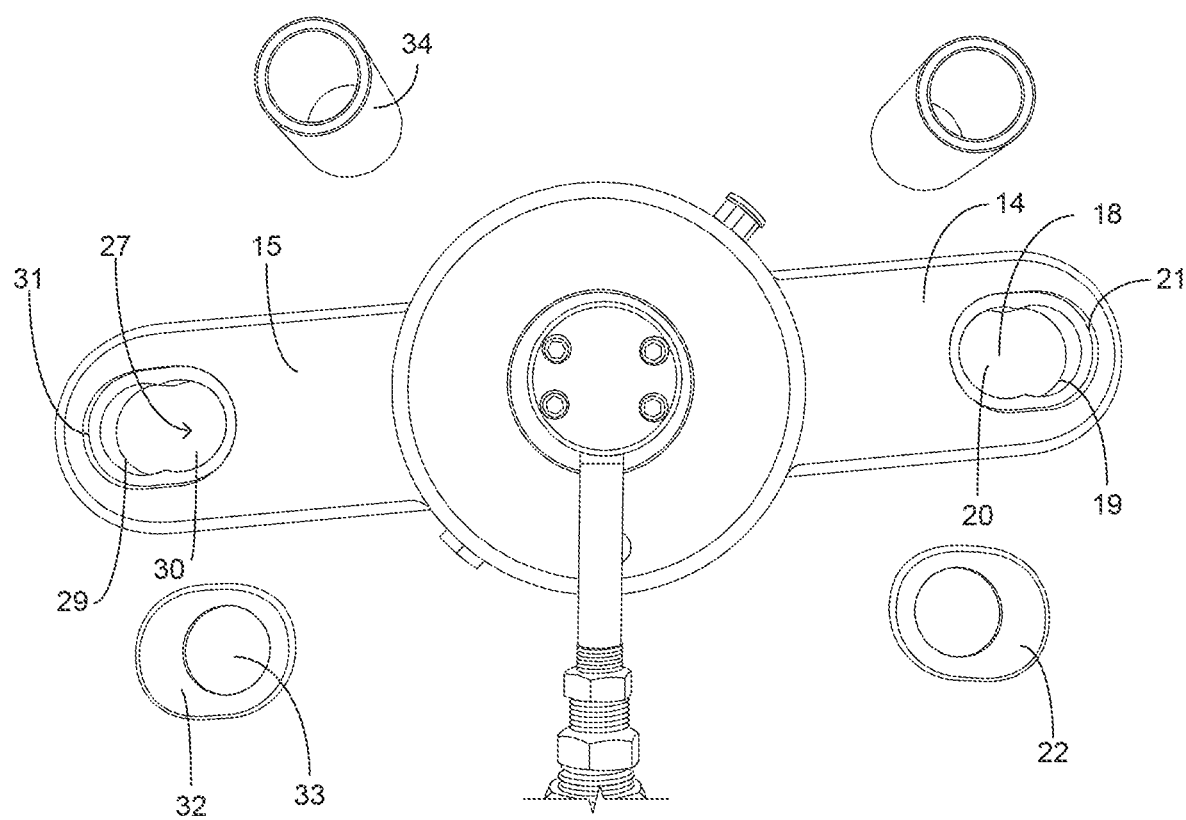
FIG. 2 is a top view of the wheel assembly of the present invention.

An embodiment of the invention, as shown and described by the various figures and accompanying text, provides a central tire inflation system 100, which includes a wheel assembly 10. Referring to FIGS. 1 and 2, the wheel assembly is provided to be mounted to each wheel of a vehicle in which the central tire inflation system 100 has been installed. The wheel assembly 10 includes a housing 12 wherein the housing 12 includes a central portion 13 and a first arm member 14 and second arm member 15. The housing 12 is manufactured from a suitable durable material such as but not limited to aluminum. The central portion 13 of the housing is annular in shape and includes cavity 16. Integrally formed with the central portion 13 of the housing 12 are first arm member 14 and second arm member 15. The first arm member 14 and second arm member 15 are formed on opposing sides of the central portion 13 of the housing 12. First arm member 14 and second arm member 15 function to span substantially across a vehicle wheel so as to be operably coupled thereto. It is contemplated within the scope of the present invention that the housing 12 could be manufactured in alternate sizes so as to accommodate vehicle wheels having different diameters. First arm member 14 further includes aperture 18 journaled therethrough distal to the central portion 13. The aperture 18 is a joined circle configuration having a first portion 19 and second portion 20 wherein the aperture 18 is generally oval in shape. The joined circle configuration of the aperture 18 provides a technique for the wheel assembly 10 to be operably coupled to various lug patterns of wheels of vehicles. The joined circle configuration permits lateral adjustment of a fastening lug to provide optimum positioning. The aperture 18 further includes ledge 21 wherein ledge 21 is circumferentially disposed around aperture 18. Ledge 21 functions to releasably secure adapter ring 22 therein. Ring adapter 22 further includes hole 23 suitable in size so as to accommodate a bolt therethrough. Operably coupled to aperture 18 is wheel mount 24. Wheel mount 24 is cylindrical in shape being hollow so as to accommodate a bolt therethrough. Second arm member 15 further includes aperture 27 journaled therethrough distal to the central portion 13. The aperture 27 is a joined circle configuration having a first portion 29 and second portion 30 wherein the aperture 27 is generally oval in shape. The aperture 27 further includes ledge 31 wherein ledge 31 is circumferentially disposed around aperture 27. Ledge 31 functions to releasably secure adapter ring 32 therein. Ring adapter 32 further includes hole 33 suitable in size so as to accommodate a bolt therethrough. Operably coupled to aperture 27 is wheel mount 34. Wheel mount 34 is cylindrical in shape being hollow so as to accommodate a bolt therethrough. Wheel mount 34 in combination with wheel mount 24 functions to provide a standoff mounting technique for housing 12. Further, the joined circle configurations of apertures 18, 27 provide the ability to laterally position a fastener therein so as to accommodate alternate wheel diameters.

Disposed within cavity 16 of the central portion 13 are the check valve assembly 40 and the bearing/cap assembly 50. The check valve assembly 40 functions as a conventional check valve allowing air flow into the wheel assembly 10 and is configured to maintain a minimum tire pressure to a tire on a wheel to which the wheel assembly 10 is mounted. The check valve assembly 40 includes upper seal/spring group 42. A seat cup assembly 44 is further included. The lower seal/spring group 46 is operably coupled to seat cup 44 and is secured utilizing hat washer 47. As will be further discussed herein, the check valve assembly 40 provides an adjustable technique to maintain a minimum air pressure for all tires to which the wheel assembly 10 is fluidly coupled. Spring 49 is configured to have adjustable tension so as to allow a user of the central tire inflation system 100 to set a minimum air pressure for the tires operably coupled thereto. By way of example but not limitation, it is contemplated within the scope of the present invention that the spring 49 has a tension so as to inhibit a pressure lower than 20 PSI within the tires.

The bearing/cap assembly 50 is operably disposed within the cavity 16 of the central portion 13. The bearing/cap assembly 50 includes the following elements: cover 51, cap 52, roller bearing 53, tube 55, retaining ring assembly 55 and adjustment screw 57. A grease fitting 59 is operably coupled to cover 51 and provides an operable coupling technique to inject the necessary lubricant into the cavity 16 of the central portion 13. The aforementioned elements of the bearing/cap assembly 50 provide rotatable coupling of the check valve assembly 40 within the cavity 16 of the central portion 13. It is contemplated within the scope of the present invention that alternate configurations of the bearing/cap assembly 50 could be provided with alternate elements and still achieve the desired functionality discussed herein. Central portion 13 includes aperture 60 that is a port for air to be fluidly directed to a tire to which the wheel assembly 10 is mounted.

Figure 3:
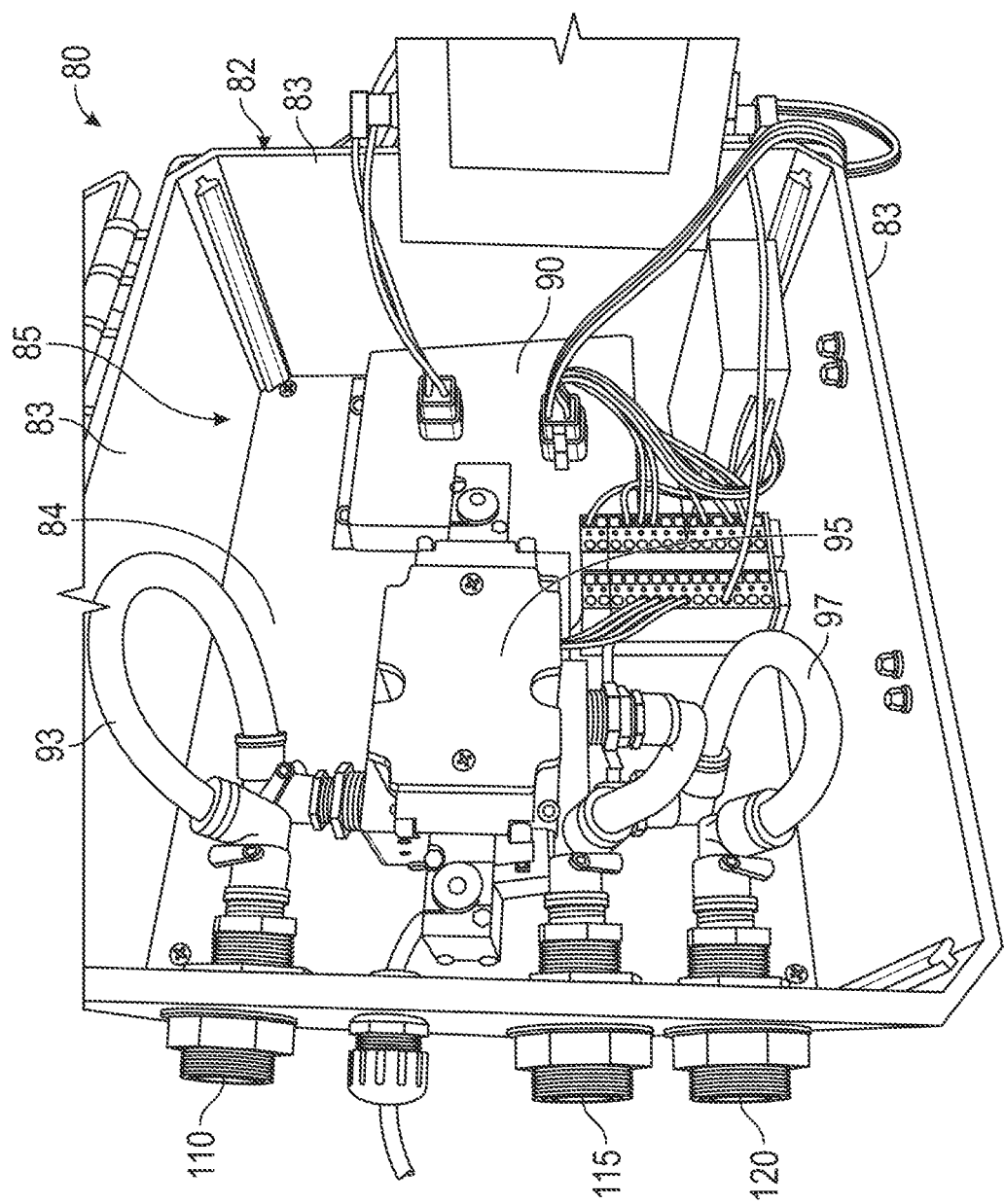
FIG. 3 is a detailed view of the controller of the present invention.

Illustrated in particular in FIG. 3 herein is the controller 80. The controller 80 is operably coupled to the wheel assembly 10 and includes the necessary electronic and pneumatic components to facilitate the operation of the central tire inflation system 100. Controller 80 includes housing 82 that is formed from a rigid material such as but not limited to metal or plastic and is generally rectangular in shape having integrally formed walls 83 and a bottom 84 forming an interior volume 85. It should be noted that in FIG. 3 herein that a top for the controller 80 is not illustrated so as to show the internal components thereof. Disposed within the interior volume 85 of the housing 82 is central processing unit 90. The central processing unit 90 includes the necessary electronic components to store, receive, transmit and manipulate data to provide operation of the central tire inflation system 100. The central processing unit 90 is operable coupled to valve 95 and provides control thereof. Valve 95 is a conventional pneumatic valve that is pneumatically coupled to the wheel assembly 10 via the first port 110. The valve 95 is pneumatically coupled to a first port 110, a second port 115 and a third port 120. The valve 95 under operable control of the central processing unit 90 will direct airflow as required to achieve an input air pressure for tires operably coupled to the wheel assembly 10. The first port 110 is fluidly coupled to valve 95 utilizing tube 93. First port 110 is fluidly coupled to the wheel assembly 10 utilizing conventional hosing (not illustrated herein). In the event that a tire operably coupled to a wheel assembly 10 has a air pressure lower than that required, the valve 95 will move to a position such that the valve 95 will direct air flow into tube 93 and discharge from the first port 110 so as to be transported to the tire(s) so as to achieve the desired minimum air pressure. Third port 120 is operably coupled to a conventional air source such as but not limited to an air tank or an air compressor (not particularly illustrated herein). When an increase in air pressure for a tire(s) operably coupled to a wheel assembly 10 is required, the valve 95 is positioned so as to receive air from the third port 120 and discharge air from the first port 110. The third port 120 is fluidly coupled to the valve 95 utilizing tube 97. In the inflate mode of the central tire inflation system 100 the valve 95 will intake air from an air source via third port 120 and discharge air via the first port 110 which is directed to the tires having the wheel assembly 10 operably coupled thereto. The valve 95 further includes an integrated pressure sensor (not illustrated herein) that monitors the air pressure within the central tire inflation system 100 and will provide either inflation or deflation of the tires operably coupled to the wheel assembly 10 as needed.

In the deflate mode, the controller 90 will provide deflation of the tires operably coupled to the wheel assembly 10. As will be further discussed herein, the central tire inflation system 100 provides a user the ability to both inflate and deflate the tires programmatically through a control panel 150. In the deflate mode, the valve 95 is positioned so as to permit airflow inward from the first port 110 and is discharged through the second port 115. The second port 115 is a discharge port that is atmospherically coupled to the external environment wherein the air received from the first port 110 in the deflate mode is discharged into the environment via the second port 115.

Figure 4:
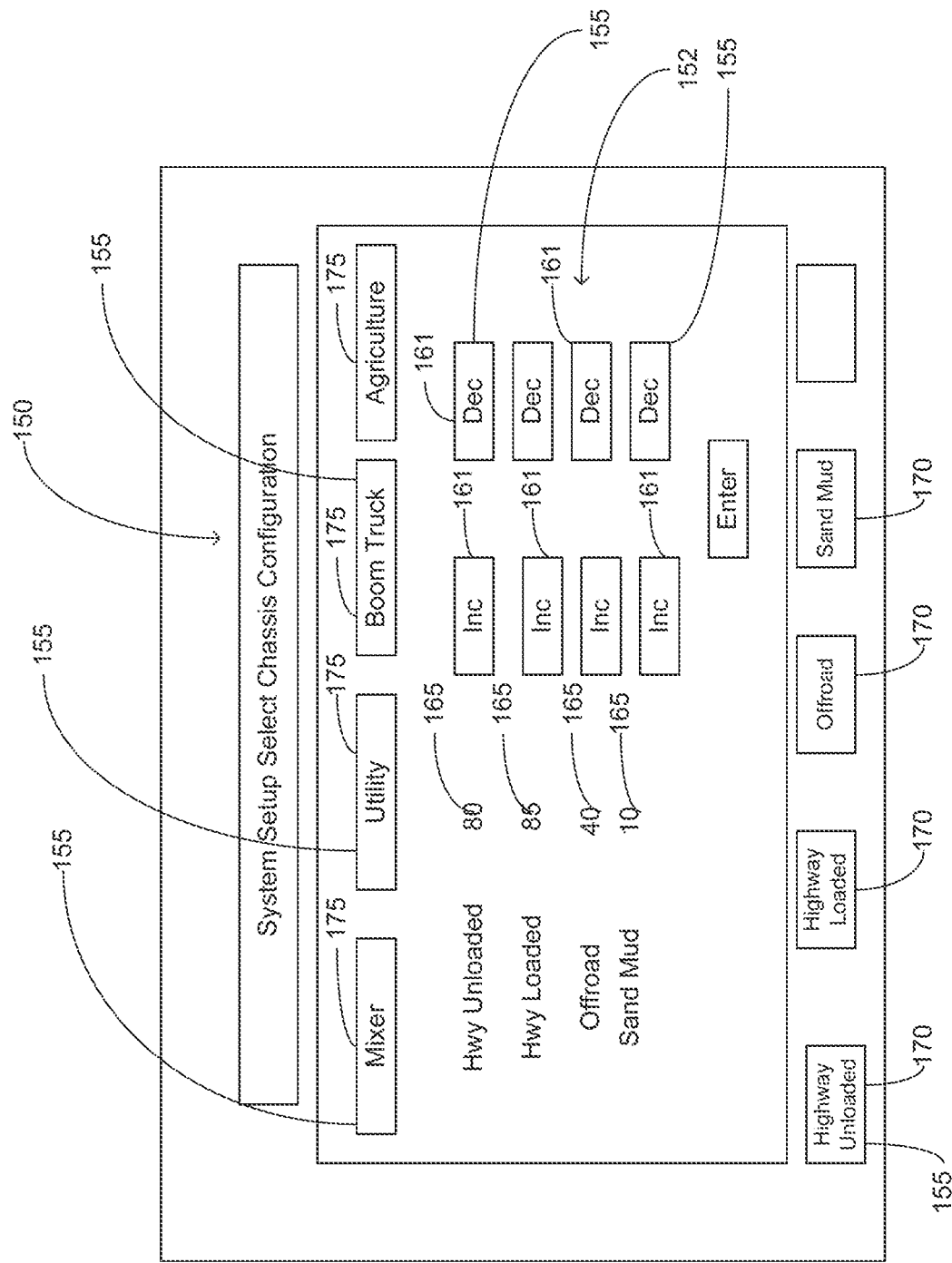
FIG. 4 is a diagrammatic view of the control panel and an exemplary screen display of the present invention.

Referring to FIG. 4 herein, a diagrammatic view of the control panel 150 is illustrated therein. The control panel 150 includes a graphical display 152 having a plurality of icons 155 and functions to provide the user interface for a user to operate the central tire inflation system 100. The graphical display 152 is a conventional touch screen interface and the control panel 150 is operably coupled to controller 80. Icons 175 are vehicle type icons. The central tire inflation system 100 is designed to be installed on various vehicle types that are utilized in alternate industries so as to execute a desired task. By way of example but not limitation, the central tire inflation system 100 can be mounted to a concrete mixer truck or a power utility truck. Both of the aforementioned vehicle types operate in different conditions and traverse across various terrains during execution of the intended functionality for that vehicle type. As such, the required tire pressure for the tires on the aforementioned vehicles must not only maintain a minimum air pressure but it is further desired that the operator of the vehicle be able to alter the air pressure within the tires depending upon the type of surface the vehicle is being driven on and what type of load the vehicle may be subjected to during operation. The vehicle type icons 175 provide the user of the central tire inflation system 100 to set desired tire air pressure through engagement of just the vehicle type icon and the default parameters stored in the central processing unit 90 for the vehicle type activated and initiated. While the graphical display 152 control panel 150 has illustrated herein four vehicle type icons 175 and further has exemplary vehicle types listed thereon, it is contemplated within the scope of the present invention that the control panel 150 could have more or less than four vehicle type icons 175 and could further have alternate vehicle types and parameters therefore programmed into the central processing unit 90.

The graphical display 152 further has displayed thereon adjustment icons 161. The adjustment icons 161 have indicia therein indicating increase or decrease more specifically abbreviations, Inc and Dec. The adjustment icons 161 provide a technique to a user to adjust the default tire air pressure for the current mode displayed on the graphical display 152. In the exemplary parameters illustrated in FIG. 4 herein, the recommended highway unloaded tire air pressure that is desires, set and monitored is 80 PSI. If a user desires to alter the default setting of 80 PSI, the user will engage the adjustment icons 161 so as to increase and/or decrease the default PSI setting. Ensuing the adjustment of the default air pressure, the central processing unit 90 stores the adjusted values for the default air pressure. It is contemplated within the scope of the present invention that the tire air pressure parameter settings 165 can be adjusted and stored in the central processing unit 90. It is further contemplated within the scope of the present invention that the central tire inflation system 100 could require a password in order to permit a user to execute the aforementioned adjustments to default air pressure. It should be understood that FIG. 4 depicts a system setup screen display for the central tire inflation system 100. It is further contemplated within the scope of the present invention that numerous alternate screens will be displayed on the graphical display 152 of the control panel 150. These alternate screens are further discussed herein and include but are not limited to a warning screen, a fault log screen, a diagnostic screen and a manual control screen. Still referring to FIG. 4, the graphical display 152 of the control panel 150 further includes mode selection icons 170. The mode selection icons 170 provide a user an interface to identify and select the driving mode in which the vehicle that the central tire inflation system 100 is operably coupled. Each alternate mode has associated therewith tire air pressure parameters and subsequent selection and activation of the mode, the central processing unit 90 will initiate the central tire inflation system 100 to inflate and/or deflate the tire air pressure according to the parameters associated with the selected mode. By way of example but not limitation, it is contemplated that the central tire inflation system 100 provides operational modes such as highway loaded, highway unloaded, off-road or sand-mud mode. These aforementioned operational modes have associated therewith pre-programmed tire air pressure parameters designed for the operational mode so as to provide the correct tire air pressure for the application of use. Furthermore, ensuing selection of the mode and activation thereof, the central processing unit 90 will continuously monitor the tire air pressure and make adjustments thereto in order to maintain the parameter settings for the selected mode. Additionally, each deviation from the tire air pressure parameters associated with active selected mode is recorded and stored in a fault log database within the central processing unit 90 for subsequent access thereto.

Figure 5:
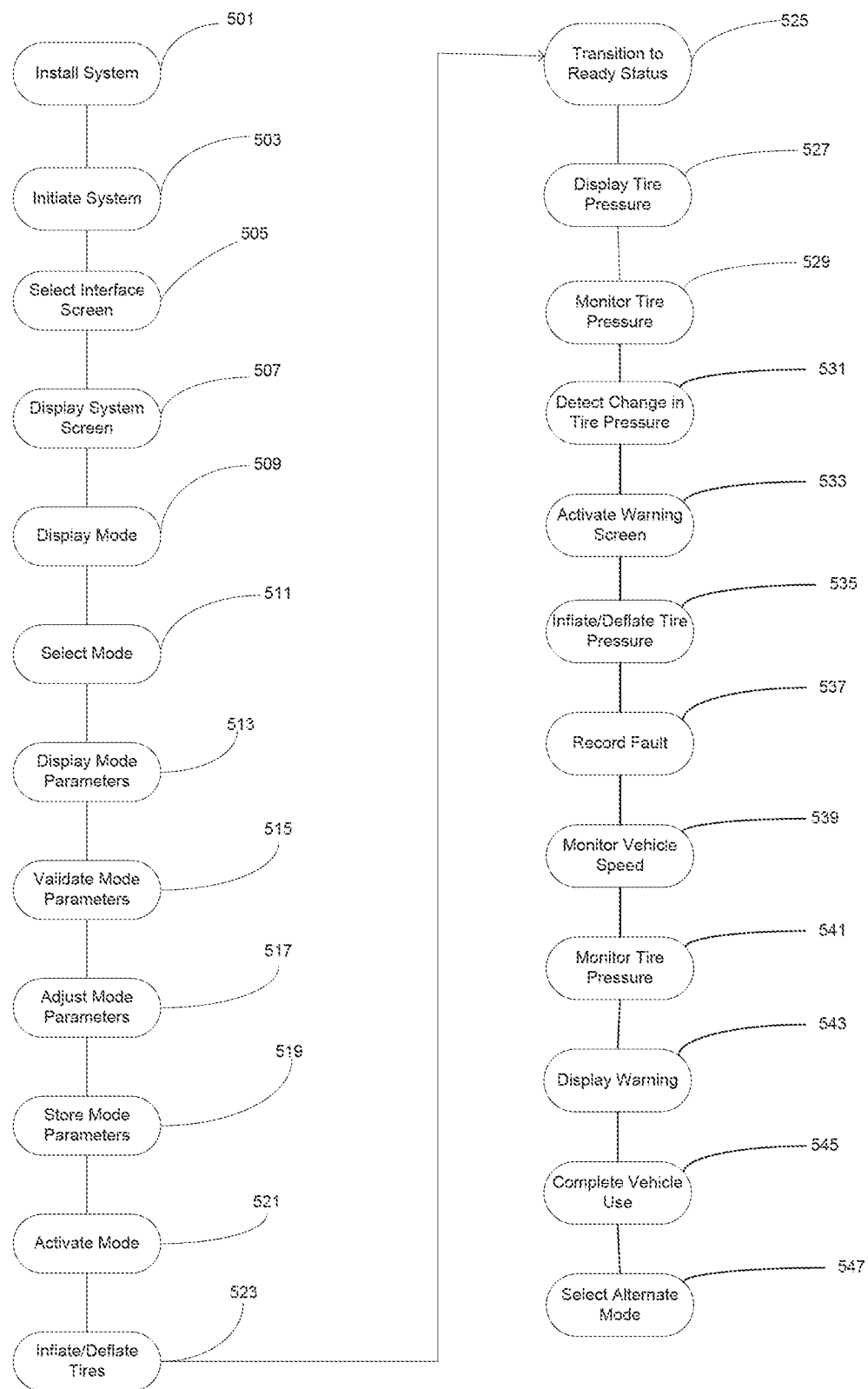
FIG. 5 is a flow chart of an exemplary method of use of the present invention.

Referring now to FIG. 5 herein, a method of operation of the central tire inflation system 100 is as follows. In step 501, the central tire inflation system 100 is installed on a vehicle such as but not limited to a commercial truck. Installation of the central tire inflation system 100 includes but is not limited to tasks such as mounting the wheel assembly 10 to the tires of the commercial truck and placing the controller 80 and control panel in the passenger compartment thereof. In step 503, the central tire inflation system 100 is initiated wherein the central processing unit 90 is activated and the control panel 150 is utilized to commence system operation. Step 505, the user will be provided an interface screen to continue operation of the central tire inflation system 100, wherein the interface screen is at least one of the following: a diagnostic screen, a warning screen, a fault log screen, a manual control screen and a system set up screen. In step 507, a user will select the system set up screen, which has been illustrated herein in FIG. 5. Step 509, the control panel 150 will display both vehicle type icons 175 and mode selection icons 170. In step 511, a user will select a vehicle type and a mode of use as previously discussed herein. Step 513, the control panel 150 will display the mode parameters on the graphical display 152. In step 515, the user will be prompted to validate the mode parameters that have been displayed on the graphical display 152. Step 517, the user may either validate the mode parameters or adjust the mode parameters utilizing the adjustment icons 161. It should be understood within the scope of the present invention that only an authorized user with a password can make adjustments to the mode parameters utilizing the adjustment icons 161. In step 519, if the mode parameters were adjusted utilizing the adjustment icons 161, the central processing unit 190 records and stores the adjusted mode parameters.

Step 521, the user will activate the selected mode and the central tire inflation system 100 will initiate operation. In step 523, the central tire inflation system 100 will detect an initial tire air pressure and will either inflate or deflate the tires as necessary so as to align with the mode parameters activated. Step 525, the central tire inflation system 100 will transition to an initial ready status wherein the tires have been adjusted to the air pressure as defined in the selected mode. In step 527, the central tire inflation system 100 will display the current tire pressure on the graphical display 152. Step 529, the central tire inflation system 100 will continuously monitor the tire air pressure on which the central tire inflation system 100 is installed. In step 531, the valve 95 having the integrated pressure sensor detects a pressure in a tire that has deviated from the tire air pressure parameter in the active mode. Step 533, the central processing unit 90 transmits a signal to the control panel 150 to display a warning signal on the graphical display that a tire has an air pressure that has deviated from the stored parameters for the active mode. In step 535, the central processing unit 90 transmits a signal to the valve 95 to initiate either inflation or deflation of the tires so as to return the tire air pressure to the tire pressure parameter of the active mode. Step 537, the central processing unit 90 records the deviation and stores in the memory thereof particularly in a fault log database for future access by a user. In step 539, the central tire inflation system 100 continues to monitor the tire air pressure of the vehicle and further monitors the speed of the vehicle. It is contemplated within the scope of the present invention that the central tire inflation system 100 could be operably integrated into the speedometer of the vehicle so as to extract the vehicle speed and display on the graphical display 152 of the control panel 150. Those skilled in the art should recognize that the vehicle speed could be obtained utilizing alternate devices and/or techniques. In step 541, the central tire inflation system 100 continues to monitor the tire pressure and compare to the tire pressure parameters of the active mode. Step 543, the central tire inflation system 100 will display a warning if the vehicle speed exceeds the recommended speed for the active mode. The warning signal is generated by the central processing unit 90 and is transmitted to the control panel 150 for display to the user. In step 545, the user completes the vehicle use. In step 547, a second user will select a mode in which the user will begin to utilize the vehicle to which the central tire inflation system 100 is mounted. The aforementioned second user could be the same individual initiating re—use of the vehicle. Operation of the central tire inflation system 100 returns to step 513 and resume all of the aforementioned steps of operation through step 513 to step 545.

Figure 6:
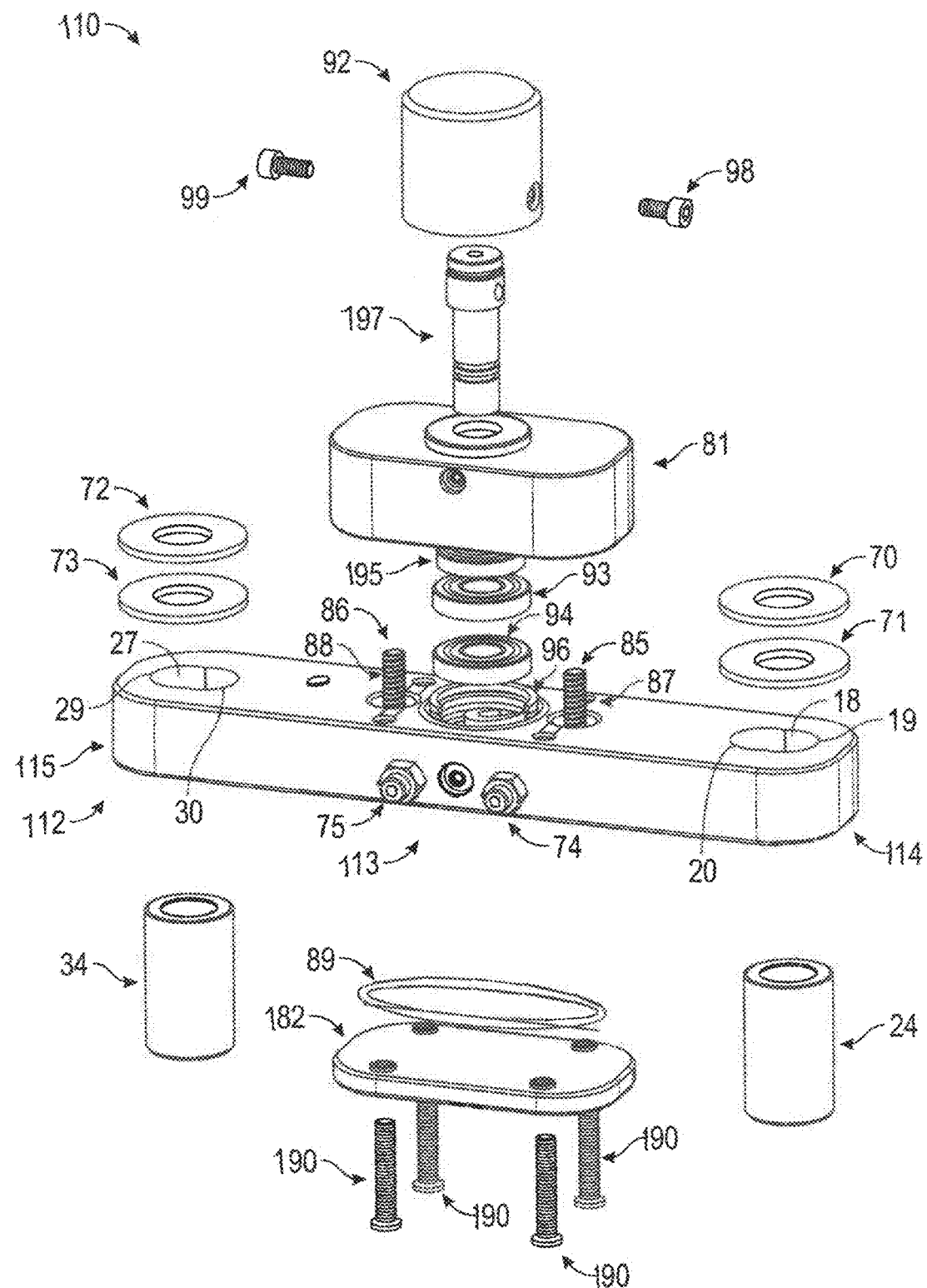
FIG. 6 is an exploded perspective view of the wheel assembly according to an embodiment of the present invention.
Figure 7:
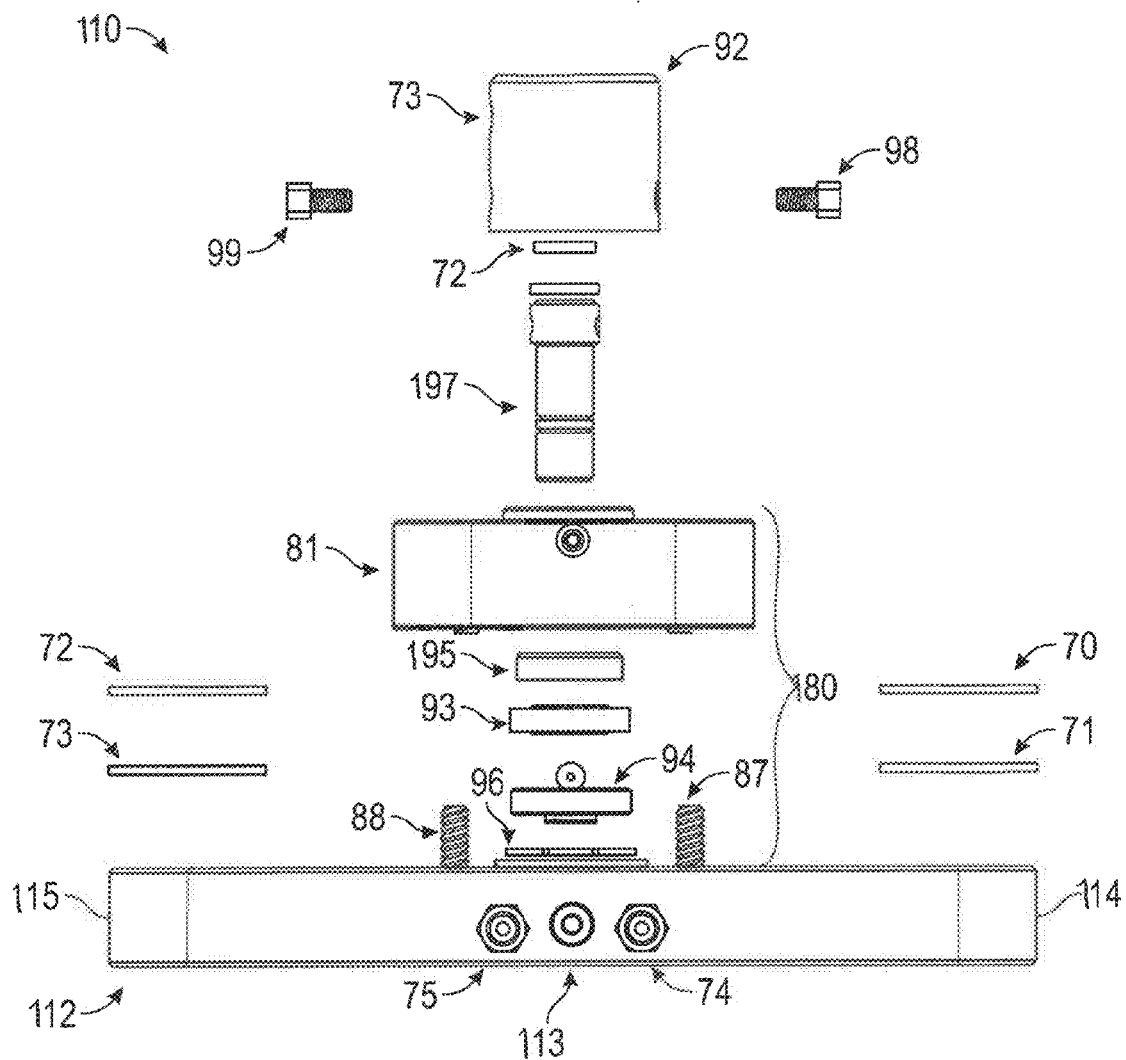
FIG. 7 is an exploded side view of the wheel assembly of FIG. 6.
Figure 7:
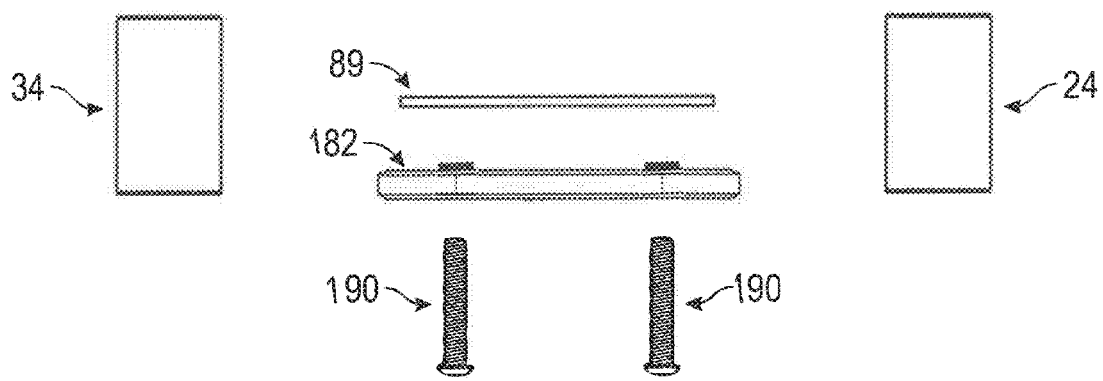
Figure 8:
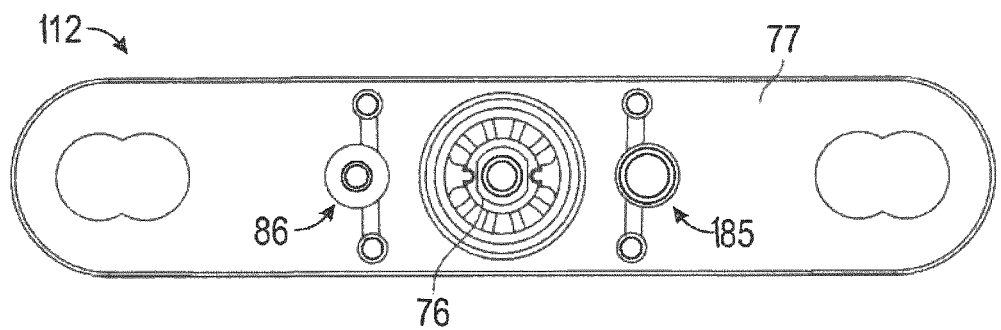
FIG. 8 is a top plan view of the housing of the wheel assembly of FIG. 6.

Referring now to FIG. 6, another embodiment of the wheel assembly 110 is provided to be mounted to at least one wheel of a vehicle in which the central tire inflation system 100 has been installed. In such an embodiment, the wheel includes two tires and the wheel assembly 110 is configured to independently control the pressure level in each of the two tires. The wheel assembly 110 includes a housing 112 wherein the housing 112 includes a central portion 113 and a first arm member 114 and second arm member 115. The housing 112 is manufactured from a suitable durable material such as but not limited to aluminum. The central portion 113 of the housing includes a cavity. Integrally formed with the central portion 113 of the housing 112 are first arm member 114 and second arm member 115. The first arm member 114 and second arm member 115 are formed on opposing sides of the central portion 113 of the housing 112. First arm member 114 and second arm member 115 function to span substantially across a vehicle wheel so as to be operably coupled thereto. It is contemplated within the scope of the present invention that the housing 112 could be manufactured in alternate sizes so as to accommodate vehicle wheels having different diameters.

First arm member 114 further includes aperture 18 journaled therethrough distal to the central portion 113. The aperture 18 is a joined circle configuration having a first portion 19 and second portion 20 wherein the aperture 18 is generally oval in shape. The joined circle configuration of the aperture 18 provides a technique for the wheel assembly 110 to be operably coupled to various lug patterns of wheels of vehicles. The joined circle configuration permits lateral adjustment of a fastening lug to provide optimum positioning. The aperture 18 may further include a ledge, as depicted in FIG. 1, wherein the ledge is circumferentially disposed around aperture 18. The ledge may function to releasably secure an adapter ring therein. One or more O-rings may be positioned above aperture 18. As depicted in FIG. 6, there are two O-rings 70, 71 positioned above aperture 18. The O-rings 70, 71 each include a central aperture suitable in size so as to accommodate a bolt therethrough. The bolt may be utilized to operably couple aperture 18 to wheel mount 24.

Wheel mount 24 is cylindrical in shape and hollow so as to accommodate a bolt therethrough.

Second arm member 115 further includes aperture 27 journaled therethrough distal to the central portion 113. The aperture 27 is a joined circle configuration having a first portion 29 and second portion 30 wherein the aperture 27 is generally oval in shape. The aperture 27 may further includes a ledge, as depicted in FIG. 1, wherein the ledge is circumferentially disposed around aperture 27. The ledge may function to releasably secure an adapter ring therein. One or more O-rings may be positioned above aperture 27. As depicted in FIG. 6, there are two O-rings 72, 73 positioned above aperture 27. The O-rings 72, 73 each include a central aperture suitable in size so as to accommodate a bolt therethrough. The bolt may be utilized to operably couple aperture 27 to wheel mount 34. Wheel mount 34 is cylindrical in shape and hollow so as to accommodate a bolt therethrough. Wheel mount 34 in combination with wheel mount 24 function to provide a standoff mounting technique for housing 112. Further, the joined circle configurations of apertures 18, 27 provide the ability to laterally position a fastener therein so as to accommodate alternate wheel diameters.

A first check valve 185 is located in the housing 112 to the right of the bearing/cap assembly 180 and a second check valve 86 is located in the housing 112 to the left of the bearing/cap assembly 180. Each check valve 185, 86 functions as a conventional check valve and each, independently allows air to flow into one tire of the wheel assembly 110. The check valves 185, 86 are configured to maintain a minimum tire pressure to a tire on a wheel to which the wheel assembly 110 is mounted. The dual check valves 185, 86 provide an adjustable technique to maintain a minimum air pressure for each tire to which the wheel assembly 110 is fluidly coupled. Springs 87, 88 may be configured to have adjustable tension or may be selected to have a desired tension, allowing a user of the central tire inflation system 100 to set a minimum air pressure for the tires operably coupled thereto. The tension of the first spring 87 may be selected to close the first check valve 185 when the air pressure in the tire in fluid communication with the first check valve 185 falls below a first threshold. The tension of the second spring 88 may be selected to close the second check valve 86 when the air pressure in the tire in fluid communication with the second check valve 86 falls below a second threshold. The first and second thresholds may have the same or different values. By way of example but not limitation, it is contemplated within the scope of the present invention that each spring 87, 88 has a tension so as to inhibit a pressure lower than 20-15 psi within the tires. In one embodiment both the first and second thresholds may be 20 psi. In another embodiment, both the first and second thresholds may be 15 psi.

The bearing assembly 180 is positioned above the housing 112 and includes a bearing housing 81, a first roller bearing 93, a second roller bearing 94, a seal 195, and a washer 96. The first roller bearing 93, second roller bearing 94, seal 195, and washer 96 may be carried within the bearing housing 81 and extend into the cavity of the housing 112. A cap 92 may be located above the bearing housing 81. A shaft 197 may be fixedly secured to the cap 92 by a pair of set screws 98, 99, extend through the bearing housing 81 and be fixedly secured thereto. An O-ring 72 may be positioned between the top end of the shaft 197 and the inside of the cap 92. A central channel of the shaft 197 may provide fluid communication between an air inlet 73 located on the cap 92 and the cavity of the housing 112. The bearing assembly 50 provides rotatable coupling of the housing 112 to the cap 92. It is contemplated within the scope of the present invention that alternate configurations of the bearing assembly 50 could be provided with alternate elements and still achieve the desired functionality discussed herein. The shaft 197 may have a first end proximate the cap 92 and a second end positioned proximate the seal 195, forming an air tight seal therewith. The surface of the second end of the shaft 197 forms the seal with the seal 195 and therefore must be machined extremely flat to prevent leaks from occurring in this seal.

An air inlet 73 located through an entirety of a wall of the cap 92 may provide access to place a channel extending longitudinally along the length of the shaft 197 in fluid communication with an external pressurized air source. The pressurized air may be provided to the air inlet 73 and fill the channel located in the shaft 197. A central aperture may be formed in the seal 195, first roller bearing 93, and second roller bearing 94 to allow the pressurized air to pass through and enter the cavity of the housing 112.

The pressurized air may be present on a first side of the first check valve 185 and the first spring 87 may be configured to open the first check valve 185 to allow the pressurized air to pass to the second side of the first check valve 185 and out to the first tire air connector 74. The first tire air connector 74 is configured to be operably coupled to a first tire of a vehicle. When the pressure within the first tire is below a first threshold, the first spring 87 may operate to close the first check valve 185 and prevent air from traveling between the first side and second side of the first check valve 185. Such a configuration may prevent the first tire from losing air pressure when the external air source losses pressure. It may also prevent a blown tire from leaking air pressure from the external air system by closing the vale and preventing further air loss.

Similarly, the pressurized air may be present on a first side of the second check valve 86 and the second spring 88 may be configured to open the second check valve 86 to allow the pressurized air to pass to the second side of the second check valve 86 and out to the second tire air connector 75. The second tire air connector 75 is configured to be operably coupled to a second tire of a vehicle. When the pressure within the second tire is below a second threshold, the second spring 88 may operate to close the second check valve 86 and prevent air from traveling between the first side and second side of the second check valve 86. Such a configuration may prevent the second tire from losing air pressure when the external air source losses pressure. It may also prevent a blown tire from leaking air pressure from the external air system by closing the valve and preventing further air loss. When either the first check valve 185 or second check valve 86 is in the closed position, the first tire and second tire are not in fluid communication with one another. When both the first check valve 185 and the second check valve 86 are in the open position, the first tire, second tire, and external air supply are in fluid communication with each other.

Figure 9:
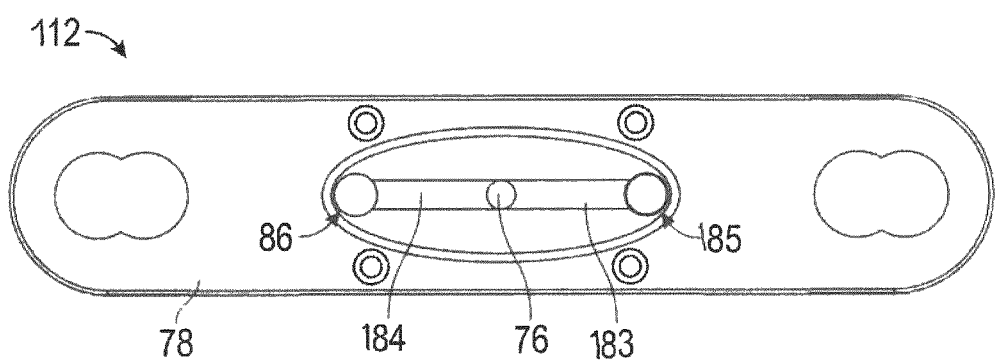
FIG. 9 is a bottom plan view of the housing of FIG. 6.
Figure 10:
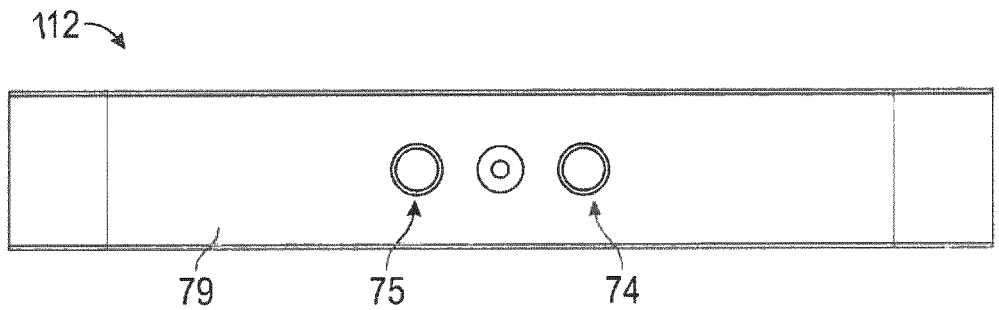
FIG. 10 is a side view of the wheel assembly of FIG. 6.
Figure 11:
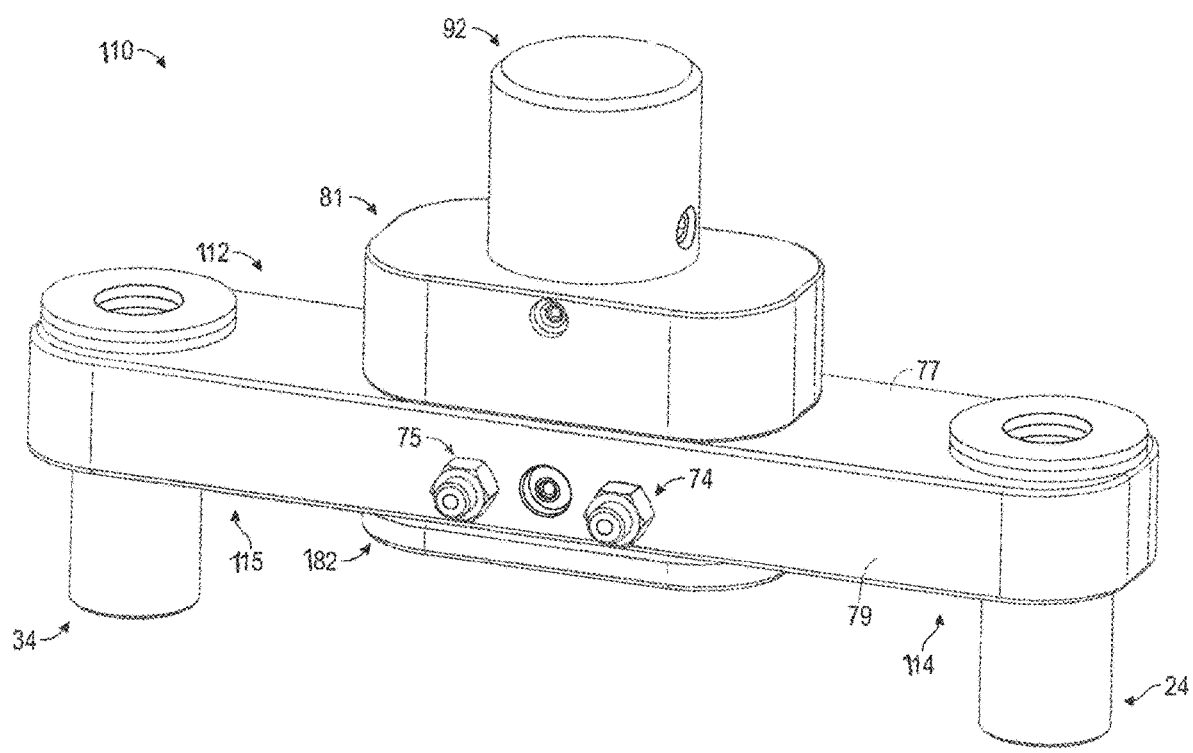
FIG. 11 is a perspective view of the wheel assembly of FIG. 6.
Figure 12:
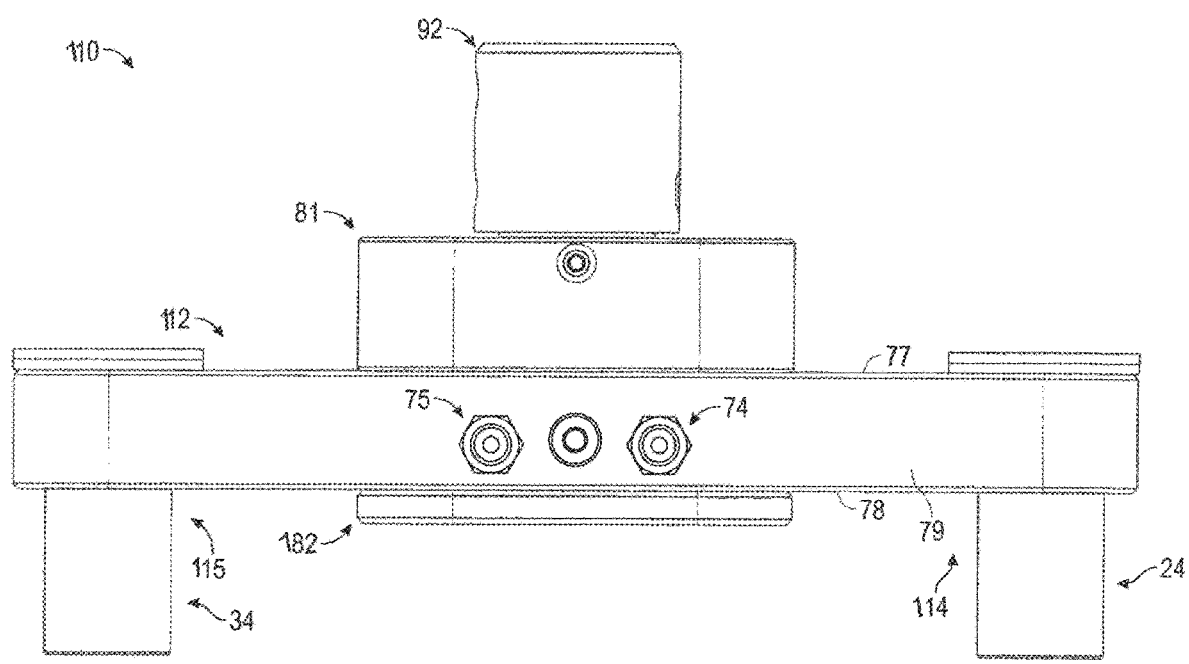
FIG. 12 is a side elevation view of the wheel assembly of FIG. 6.

The housing 112 may include passageways to allow the pressurized air to operate as described above. Turning to FIG. 9, the housing 112 may include a central channel 76 located through an entirety of the thickness of the housing 112 from the top side 77 to the bottom side 78 of the housing 112. This central channel 76 may be in fluid communication with the channel located along the length of the shaft 197. Air may pass from the channel of the shaft 197 through the central channel 76 and enter a first passageway 183 or a second passageway 184 formed on the bottom side 78 of the housing. The first passageway 183 may fluidly couple the first side of the first check valve 185 to the central channel 76. The second passageway 184 may fluidly couple the first side of the second check valve 86 to the central channel 76. A plate 182 may be secured to the bottom side 78 of the housing 112 to fully enclose the first passageway 183 and second passageway 184. An O-ring 89 may be fitted in a channel formed near a perimeter of the plate 182 and utilized to create an airtight seal between the plate 182 and the bottom side 78 of the housing 112. A plurality of bolts 190 may be utilized to secure the plate 182 to the housing 112.

When the first check valve 185 is open, the first passageway 183 may be in fluid communication with the first tire air connector 74 formed on a front side of the housing 112. When the first check valve 185 is closed, the first passageway 183 may be sealed off and not in fluid communication with the first tire air connector 74. When the second check valve 86 is open, the second passageway 184 may be in fluid communication with the second tire air connector 75 formed on a front side of the housing 112. When the second check valve 86 is closed, the second passageway 184 may be sealed off and not in fluid communication with the second tire air connector 75.

Illustrated in particular in FIG. 3 herein is the controller 80. The controller 80 is operably coupled to the wheel assembly 10 and includes the necessary electronic and pneumatic components to facilitate the operation of the central tire inflation system 100. Controller 80 includes housing 82 that is formed from a rigid material such as but not limited to metal or plastic and is generally rectangular in shape having integrally formed walls 83 and a bottom 84 forming an interior volume 85. It should be noted that in FIG. 3 herein that a top for the controller 80 is not illustrated so as to show the internal components thereof. Disposed within the interior volume 85 of the housing 82 is central processing unit 90. The central processing unit 90 includes the necessary electronic components to store, receive, transmit and manipulate data to provide operation of the central tire inflation system 100. The central processing unit 90 is operable coupled to valve 95 and provides control thereof. Valve 95 is a conventional pneumatic valve that is pneumatically coupled to the wheel assembly 10 via the first port 110. The valve 95 is pneumatically coupled to a first port 110, a second port 115 and a third port 120. The valve 95 under operable control of the central processing unit 90 will direct airflow as required to achieve an input air pressure for tires operably coupled to the wheel assembly 10. The first port 110 is fluidly coupled to valve 95 utilizing tube 93. First port 110 is fluidly coupled to the wheel assembly 10 utilizing conventional hosing (not illustrated herein). In the event that a tire operably coupled to a wheel assembly 10 has a air pressure lower than that required, the valve 95 will move to a position such that the valve 95 will direct air flow into tube 93 and discharge from the first port 110 so as to be transported to the tire(s) so as to achieve the desired minimum air pressure. Third port 120 is operably coupled to a conventional air source such as but not limited to an air tank or an air compressor (not particularly illustrated herein). When an increase in air pressure for a tire(s) operably coupled to a wheel assembly 10 is required, the valve 95 is positioned so as to receive air from the third port 120 and discharge air from the first port 110. The third port 120 is fluidly coupled to the valve 95 utilizing tube 97. In the inflate mode of the central tire inflation system 100 the valve 95 will intake air from an air source via third port 120 and discharge air via the first port 110 which is directed to the tires having the wheel assembly 10 operably coupled thereto. The valve 95 further includes an integrated pressure sensor (not illustrated herein) that monitors the air pressure within the central tire inflation system 100 and will provide either inflation or deflation of the tires operably coupled to the wheel assembly 10 as needed.

In the deflate mode, the controller 90 will provide deflation of the tires operably coupled to the wheel assembly 10. As will be further discussed herein, the central tire inflation system 100 provides a user the ability to both inflate and deflate the tires programmatically through a control panel 150. In the deflate mode, the valve 95 is positioned so as to permit airflow inward from the first port 110 and is discharged through the second port 115. The second port 115 is a discharge port that is atmospherically coupled to the external environment wherein the air received from the first port 110 in the deflate mode is discharged into the environment via the second port 115.

Referring to FIG. 4 herein, a diagrammatic view of the control panel 150 is illustrated therein. The control panel 150 includes a graphical display 152 having a plurality of icons 155 and functions to provide the user interface for a user to operate the central tire inflation system 100. The graphical display 152 is a conventional touch screen interface and the control panel 150 is operably coupled to controller 80. Icons 175 are vehicle type icons. The central tire inflation system 100 is designed to be installed on various vehicle types that are utilized in alternate industries so as to execute a desired task. By way of example but not limitation, the central tire inflation system 100 can be mounted to a concrete mixer truck or a power utility truck. Both of the aforementioned vehicle types operate in different conditions and traverse across various terrains during execution of the intended functionality for that vehicle type. As such, the required tire pressure for the tires on the aforementioned vehicles must not only maintain a minimum air pressure but it is further desired that the operator of the vehicle be able to alter the air pressure within the tires depending upon the type of surface the vehicle is being driven on and what type of load the vehicle may be subjected to during operation. The vehicle type icons 175 provide the user of the central tire inflation system 100 to set desired tire air pressure through engagement of just the vehicle type icon and the default parameters stored in the central processing unit 90 for the vehicle type activated and initiated. While the graphical display 152 control panel 150 has illustrated herein four vehicle type icons 175 and further has exemplary vehicle types listed thereon, it is contemplated within the scope of the present invention that the control panel 150 could have more or less than four vehicle type icons 175 and could further have alternate vehicle types and parameters therefore programmed into the central processing unit 90.

The graphical display 152 further has displayed thereon adjustment icons 161. The adjustment icons 161 have indicia therein indicating increase or decrease more specifically abbreviations, Inc and Dec. The adjustment icons 161 provide a technique to a user to adjust the default tire air pressure for the current mode displayed on the graphical display 152. In the exemplary parameters illustrated in FIG. 4 herein, the recommended highway unloaded tire air pressure that is desires, set and monitored is 80 PSI. If a user desires to alter the default setting of 80 PSI, the user will engage the adjustment icons 161 so as to increase and/or decrease the default PSI setting. Ensuing the adjustment of the default air pressure, the central processing unit 90 stores the adjusted values for the default air pressure. It is contemplated within the scope of the present invention that the tire air pressure parameter settings 165 can be adjusted and stored in the central processing unit 90. It is further contemplated within the scope of the present invention that the central tire inflation system 100 could require a password in order to permit a user to execute the aforementioned adjustments to default air pressure. It should be understood that FIG. 4 depicts a system setup screen display for the central tire inflation system 100. It is further contemplated within the scope of the present invention that numerous alternate screens will be displayed on the graphical display 152 of the control panel 150. These alternate screens are further discussed herein and include but are not limited to a warning screen, a fault log screen, a diagnostic screen and a manual control screen. Still referring to FIG. 4, the graphical display 152 of the control panel 150 further includes mode selection icons 170. The mode selection icons 170 provide a user an interface to identify and select the driving mode in which the vehicle that the central tire inflation system 100 is operably coupled. Each alternate mode has associated therewith tire air pressure parameters and subsequent selection and activation of the mode, the central processing unit 90 will initiate the central tire inflation system 100 to inflate and/or deflate the tire air pressure according to the parameters associated with the selected mode. By way of example but not limitation, it is contemplated that the central tire inflation system 100 provides operational modes such as highway loaded, highway unloaded, off-road or sand-mud mode. These aforementioned operational modes have associated therewith pre-programmed tire air pressure parameters designed for the operational mode so as to provide the correct tire air pressure for the application of use. Furthermore, ensuing selection of the mode and activation thereof, the central processing unit 90 will continuously monitor the tire air pressure and make adjustments thereto in order to maintain the parameter settings for the selected mode. Additionally, each deviation from the tire air pressure parameters associated with active selected mode is recorded and stored in a fault log database within the central processing unit 90 for subsequent access thereto.

Referring now to FIG. 5 herein, a method of operation of the central tire inflation system 100 is as follows. In step 501, the central tire inflation system 100 is installed on a vehicle such as but not limited to a commercial truck. Installation of the central tire inflation system 100 includes but is not limited to tasks such as mounting the wheel assembly 10 to the tires of the commercial truck and placing the controller 80 and control panel in the passenger compartment thereof. In step 503, the central tire inflation system 100 is initiated wherein the central processing unit 90 is activated and the control panel 150 is utilized to commence system operation. Step 505, the user will be provided an interface screen to continue operation of the central tire inflation system 100, wherein the interface screen is at least one of the following: a diagnostic screen, a warning screen, a fault log screen, a manual control screen and a system set up screen. In step 507, a user will select the system set up screen, which has been illustrated herein in FIG. 5. Step 509, the control panel 150 will display both vehicle type icons 175 and mode selection icons 170. In step 511, a user will select a vehicle type and a mode of use as previously discussed herein. Step 513, the control panel 150 will display the mode parameters on the graphical display 152. In step 515, the user will be prompted to validate the mode parameters that have been displayed on the graphical display 152. Step 517, the user may either validate the mode parameters or adjust the mode parameters utilizing the adjustment icons 161. It should be understood within the scope of the present invention that only an authorized user with a password can make adjustments to the mode parameters utilizing the adjustment icons 161. In step 519, if the mode parameters were adjusted utilizing the adjustment icons 161, the central processing unit 190 records and stores the adjusted mode parameters.

Step 521, the user will activate the selected mode and the central tire inflation system 100 will initiate operation. In step 523, the central tire inflation system 100 will detect an initial tire air pressure and will either inflate or deflate the tires as necessary so as to align with the mode parameters activated. Step 525, the central tire inflation system 100 will transition to an initial ready status wherein the tires have been adjusted to the air pressure as defined in the selected mode. In step 527, the central tire inflation system 100 will display the current tire pressure on the graphical display 152. Step 529, the central tire inflation system 100 will continuously monitor the tire air pressure on which the central tire inflation system 100 is installed. In step 531, the valve 95 having the integrated pressure sensor detects a pressure in a tire that has deviated from the tire air pressure parameter in the active mode. Step 533, the central processing unit 90 transmits a signal to the control panel 150 to display a warning signal on the graphical display that a tire has an air pressure that has deviated from the stored parameters for the active mode. In step 535, the central processing unit 90 transmits a signal to the valve 95 to initiate either inflation or deflation of the tires so as to return the tire air pressure to the tire pressure parameter of the active mode. Step 537, the central processing unit 90 records the deviation and stores in the memory thereof particularly in a fault log database for future access by a user. In step 539, the central tire inflation system 100 continues to monitor the tire air pressure of the vehicle and further monitors the speed of the vehicle. It is contemplated within the scope of the present invention that the central tire inflation system 100 could be operably integrated into the speedometer of the vehicle so as to extract the vehicle speed and display on the graphical display 152 of the control panel 150. Those skilled in the art should recognize that the vehicle speed could be obtained utilizing alternate devices and/or techniques. In step 541, the central tire inflation system 100 continues to monitor the tire pressure and compare to the tire pressure parameters of the active mode. Step 543, the central tire inflation system 100 will display a warning if the vehicle speed exceeds the recommended speed for the active mode. The warning signal is generated by the central processing unit 90 and is transmitted to the control panel 150 for display to the user. In step 545, the user completes the vehicle use. In step 547, a second user will select a mode in which the user will begin to utilize the vehicle to which the central tire inflation system 100 is mounted. The aforementioned second user could be the same individual initiating re-use of the vehicle. Operation of the central tire inflation system 100 returns to step 513 and resume all of the aforementioned steps of operation through step 513 to step 545.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A central tire inflation system configured to monitor and maintain an air pressure of a first tire and a second tire mounted to a wheel of a vehicle comprising:
    a wheel assembly configured to be operably coupled to the wheel and comprising:
        a housing in fluid communication with an external air supply,
        a first check valve carried by the housing and in fluid communication with the external air supply,
        a second check valve carried by the housing and in fluid communication with the external air supply,
        a first tire air connector carried by the housing and in fluid communication with the first check valve and configured to be operably coupled to the first tire,
        a second tire air connector carried by the housing and in fluid communication with the second check valve and configured to be operably coupled to the second tire, and
        a cap configured to be secured to the vehicle, configured to secure to the external air supply, and configured to remain in a fixed position relative thereto; and
    a shaft having a first end carried within the cap and adapted to be fluidly coupled to the external air supply;
    wherein the first tire, the second tire, and the external air supply are in fluid communication when both the first check valve and the second check valve are in an open position;
    wherein the first tire and the second tire are not in fluid communication when either the first check valve or the second check valve is in a closed position;
    wherein the housing is rotatably secured to the cap;
    wherein a second end of the shaft, which opposes the first end, is in fluid communication with the first check valve and the second check valve; and
    wherein the housing has a central channel in fluid communication with the external air supply and extending from a top side to a bottom side of the housing.

2. The central tire inflation system of claim 1 wherein the housing further comprises a first passageway located on the bottom side of the housing and configured to place the central channel in fluid communication with the first check valve.

3. The central tire inflation system of claim 2 wherein the housing further comprises a second passageway located on a bottom side of the housing and configured to place the central channel in fluid communication with the second check valve.

4. The central tire inflation system of claim 3 further comprising:
    a plate secured to the bottom side of the housing over an entirety of the first passageway and the second passageway.

5. The central tire inflation system of claim 1 further comprising: the second end of the shaft having a flat annular surface.

6. The central tire inflation system of claim 5 further comprising:
    a bearing housing adapted to receive the shaft and secured to the housing.

7. The central tire inflation system of claim 6 further comprising:
    a first roller bearing carried by the bearing housing and having a central annular opening.

8. The central tire inflation system of claim 7 further comprising:
    a seal having a central annular aperture and a first flat surface opposing a second flat surface;
    wherein the first flat surface of the seal is positioned proximate the flat annular surface of the shaft; and
    wherein the second flat surface of the seal is positioned proximate the first roller bearing.

9. The central tire inflation system of claim 8 further comprising a second roller bearing positioned between the first roller bearing and the housing.

10. The system of claim 1 wherein the first check valve is configured to move to the closed position when the air pressure of the first tire drops below a first minimum air pressure value; and
    wherein the second check valve is configured to move to the closed position when the air pressure of the second tire drops below a second minimum air pressure value.

11. The system of claim 1 further comprising:
    a controller further comprising:
        a housing having a plurality of walls and a bottom forming an interior volume,
        a central processing unit having an electronic processing unit operable to receive, store, transmit and manipulate data,
        wherein the controller has a plurality of modes of operation,
    and
        wherein the modes of operation include default parameters for air pressure within the tires of the vehicle; and
    wherein the central tire inflation system is configured to monitor the air pressure of the first tire and the air pressure of the second tire and provide inflation or deflation thereof based on the mode of operation.

12. The system of claim 1 wherein the housing further comprises:
   a central portion;
   a first arm member extending outward from the central portion; and
   a second arm member extending outward from the central portion opposite from the first arm member.

13. The system of claim 12 wherein the first arm member comprises a first aperture being a first joined circle configuration and the second arm member comprises a second aperture being a second joined circle configuration.

14. A central tire inflation system configured to monitor and maintain an air pressure of a first tire and a second tire mounted to a wheel of a vehicle comprising:
   a wheel assembly configured to be operably coupled to the wheel and comprising:
      a housing having a central channel in fluid communication with an external air supply and extending from a top side to a bottom side of the housing, a first passageway located on the bottom side of the housing and configured to place the central channel in fluid communication with a first check valve, and a second passageway located on the bottom side of the housing and configured to place the central channel in fluid communication with a second check valve,
      a plate secured to the bottom side of the housing over an entirety of the first passageway and the second passageway,
      the first check valve carried by the housing and in fluid communication with the external air supply,
      the second check valve carried by the housing and in fluid communication with the external air supply,
      a first tire air connector carried by the housing and in fluid communication with the first check valve and configured to be operably coupled to the first tire,
      a second tire air connector carried by the housing and in fluid communication with the second check valve and configured to be operably coupled to the second tire,
      a cap configured to secure to the external air supply, secure to the vehicle, and to remain in a fixed position relative thereto, and
      a shaft having a first end carried within the cap and adapted to be fluidly coupled to the external air supply;
   wherein a second end of the shaft, which opposes the first end, is in fluid communication with the first check valve and the second check valve;
   wherein the housing is rotatably secured to the cap;
   wherein the first tire, the second tire, and the external air supply are in fluid communication when either the first check valve or the second check valve is in an open position; and
   wherein the first tire and the second tire are not in fluid communication when either the first check valve or the second check valve is in a closed position.

* * * * *